(12) United States Patent
Wang et al.

(10) Patent No.: US 8,078,199 B2
(45) Date of Patent: Dec. 13, 2011

(54) METHOD AND SYSTEM FOR ACCELERATING PAGE ACCESSING IN THE WIDE BAND WIRELESS SYSTEM

(75) Inventors: Ning Wang, Shenzhen (CN); Ling Xu, Shenzhen (CN); Hong Chen, Shenzhen (CN); Dushi Lou, Shenzhen (CN)

(73) Assignee: ZTE Corporation, Guangdong (CN)

( * ) Notice: Subject to any disclaimer, the term of this patent is extended or adjusted under 35 U.S.C. 154(b) by 669 days.

(21) Appl. No.: 12/278,020

(22) PCT Filed: Feb. 15, 2007

(86) PCT No.: PCT/CN2007/000570
§ 371 (c)(1),
(2), (4) Date: Dec. 12, 2008

(87) PCT Pub. No.: WO2007/093129
PCT Pub. Date: Aug. 23, 2007

(65) Prior Publication Data
US 2010/0069041 A1  Mar. 18, 2010

(30) Foreign Application Priority Data
Feb. 17, 2006 (CN) .......................... 2006 1 0007838

(51) Int. Cl.
*H04W 68/00* (2009.01)
*H04B 7/00* (2006.01)
(52) U.S. Cl. ....................................... 455/458; 455/515
(58) Field of Classification Search .................. 455/458, 455/515
See application file for complete search history.

(56) References Cited

U.S. PATENT DOCUMENTS
5,966,662 A * 10/1999 Murto ........................... 455/458

FOREIGN PATENT DOCUMENTS
CN          1592273 A    3/2005
CN          1602104 A    3/2005
WO    WO2005006800 A1   1/2005

* cited by examiner

*Primary Examiner* — Lester Kincaid
*Assistant Examiner* — Joel Ajayi
(74) *Attorney, Agent, or Firm* — Ming Chow; Sinorica, LLC

(57) ABSTRACT

An implementation method and system for accelerating the paging access of a mobile station in broadband wireless system are disclosed, and this system comprises base stations, mobile stations, an anchor access network gateway, an authenticator and a paging controller. The implementation method includes: (a) the anchor access network gateway sends to the base station a Paging Announce message including at least mobile station identifier and the authenticator identifier of the mobile station; (b) the base station keeps the corresponding relationship of the authenticator identifier and the mobile station, and sends a MOS-PAG-ADV message to the mobile station; (c) after the base station receives the RNG-REQ message from the mobile station, it interacts with the authenticator using the authenticator identifier to obtain the authentication key and perform the authentication; and acquire the information of mobile station from the paging controller; (d) before or after the base station requests the anchor access network gateway to establish a data channel, it sends a RNG-RES message to the mobile station; (e) after the anchor access network gateway receives the Data Channel Establishment Acknowledgement message, it informs the paging controller to delete the mobile station information thereon. The present invention can accelerate the process of paging access of the mobile station.

19 Claims, 2 Drawing Sheets

US 8,078,199 B2

METHOD AND SYSTEM FOR ACCELERATING PAGE ACCESSING IN THE WIDE BAND WIRELESS SYSTEM

TECHNICAL FIELD

The present invention relates to an implementation method and system for paging access in broadband wireless system, and more specifically to an implementation method and system for accelerating the paging access in broadband wireless system applying 802.16e standard.

TECHNICAL BACKGROUND 802.16e standard is a broadband wireless access standard established by IEEE standards organization; compared with 802.16 standard, many methods to support the mobile station mobility are added, such as handover and power saving mechanism.

Idle mode is a very important power saving mechanism in 802.16e system. In order to support the paging of mobile station (MS) in Idle mode, the standard offers the concept of paging group. Several base stations (BS) are divided into a paging group, and overlapping is allowed among the paging groups. Several paging groups are managed by a paging controller (PC). As shown in FIG. 1, base station 0 and base station 1 belong to the paging group A, base station 1 and base station 2 belong to the paging group B, and the paging controller 0 and the paging controller 1 control the paging group A, the paging controller 0 and paging controller 1 are connected with Location Register (LR) respectively to store the MS-related information, and the paging controller 0 and the paging controller 1 simultaneously connect with the base station 0 and the base station 1 to originate the paging for the MS in the paging group A. The access network gateway (ASN-GW) simultaneously connects with the paging controller 0 and the paging controller 1.

The structural diagram of the network of 802.16e system is shown as FIG. 2, which includes function modules such as the base station (BS), the relay access network gateway (Relay ASN-GW), the anchor access network gateway (Anchor ASN-GW), the home agent (HA), the authenticator, the relay paging controller (Relay PC) and the anchor paging controller (Anchor PC), and so on.

The base station connects with the Anchor ASN-GW (or through the Relay ASN-GW), who is charge for the egress routing of IP network segment where the whole access network locates, and the Anchor ASN-GW connects with the authenticator which is the authentication logic module in EAP protocol and takes charge of the authentication of the mobile station. For mobile IP, the Anchor ASN-GW implements the function of foreign agent (FA) and connects with the HA through IP network. The data sent to the mobile station is forwarded to the Anchor ASN-GW by the HA through the mobile IP tunnel.

The Anchor paging controller controls the paging of the mobile station and the position renewal, and the storage of the associated information of the MS. The Delay paging controller takes charge of the forwarding of the Paging Announce message between the Anchor paging controller and the base station.

The home agent is a function entity in the mobile IP mechanism, and its responsibility is to maintain the local registration information, the position information of the mobile station and forward the date routed to the mobile station to the foreign agent or the mobile station through the mobile IP channel.

When the MS is in Idle mode and downlink traffic data arrives, the Anchor PC is responsible for originating a paging process, and partial or all BSs in the paging group to which the MS belongs will send the MOB-PAG-ADV (mobile paging advertisement) message, and the MS will decide whether it needs to exit Idle mode and re-access the network according to the indication in the MOB-PAG-ADV message.

When the mobile station is switched from the normal mode to the Idle mode, the current information of the mobile station (including the basic functions and the traffic stream information) should be saved in Anchor PC, and once the MS is aroused in Idle mode, it can retrieve the associated message from the Anchor PC and accelerate the process of network access.

How to shorten the time for the mobile station accessing the network in the process of paging is one of hotspots of the present research. The basic process of paging is offered by the NWG working group in the Wimax organization. However, the deficiency of the process is that after the terminal MS starts the flow of accessing, the BS obtains the Authenticator ID from the response message for the MS Info (mobile station information) Request message of the Anchor PC (the Anchor paging controller), and afterwards, the BS interacts with the authenticator to obtain the key for the HMAC/CMAC authentication of the ranging request (RNG-REQ) message, thus lengthening the time of the paging access of the mobile station.

SUMMARY OF THE INVENTION

The technical problem to be solved in the present invention is to offer an implementation method and system for accelerating the paging access of the mobile station to shorten the time of paging re-access to the network of the mobile station.

The technical scheme applied by the present invention is:

An implementation method for accelerating the paging access of the mobile station in broadband wireless systems includes the following steps:

(a) If the Anchor ASN-GW finds out that the MS is in Idle mode when it receives the downlink data addressed to the mobile station, it firstly notifies the Anchor PC to which the mobile station belongs to page the mobile station, and when the Anchor PC finds out that the mobile station is authenticated with the paging operation, it uses other Relay PC to send, or directly sends, the Paging Announce message including at least the mobile station identifier (MSID) and the Authenticator ID of the mobile station to partial or all BSs in the paging group;

(b) Said base station keeps the corresponding relationship between the Authenticator ID and the MS after it receives the message; and sends the MOB-PAG-ADV message of the air interface to the mobile station;

(c) After the mobile station receives the MOB-PAG-ADV message which addresses itself, it starts the process of paging access, and the mobile station will send RNG-REQ message to the base station after it completes the uplink synchronization, and after the base station receives the RNG-REQ message returned by the mobile station, it interacts with the authenticator with the Authenticator ID parameter corresponding to the MS to obtain the authentication key (AK) and authenticate the RNG-REQ message; the base station obtains the associated information of said mobile station from the Anchor PC while it interacts with the authenticator;

(d) Said base station requests the Anchor ASN-GW to establish a data channel, and before or after the data channel is established, the base station sends RNG-RES message to the mobile station;

(e) After the mobile station completes the network access, the base station sends the Data Channel Establishment Acknowledgement message to the Anchor ASN-GW, and after the Anchor ASN-GW receives the message sent by the base station, it sends the MS Info Release Announce message to the Anchor PC to notify it to delete the information saved on it by the mobile station.

Furthermore, in step (d), after the base station confirms that the data channel is successfully established and the message is authenticated, it sends a RNG-RES message with "success" indication to the mobile station.

Furthermore, in step (c), if the authentication of the process of RNG-REQ message is not passed, the base station will directly feed a RNG-RES message with "failure" indication back to the mobile station, and the subsequent steps are stopped;

Furthermore, in step (a), the downlink data addressed to the mobile station and received by the Anchor ASN-GW is forwarded by the HA through the mobile IP tunnel.

Furthermore, step (a) further includes: (a1) Based on the mobile station identifier, if the Anchor ASN-GW identifies that the mobile station is in Idle mode after it receives the downlink data addresses to the mobile station, it sends MS Info Request message to the Anchor PC which the mobile station belongs to, and the message includes the MSID and the parameters of the paging indication; (a2) The Anchor PC sends the MS Info Response message to the Anchor ASN-GW, and the message includes the mobile station identifier and the parameters of the traffic authentication indication which indicates whether the paging operation is authenticated or not.

Furthermore, in step (c), the MS Info Response message includes the following parameters: MSID, Anchor ASN-GW identifier, the preservation information of the mobile station in Idle mode, and the mobile station information.

Furthermore, in step (d), the Data Channel Establishment Response message includes: MSID, the carrying tunnel parameters, the traffic stream identifier, the information of quality of service.

Furthermore, all interaction messages between the base station and the Anchor ASN-GW are sent through Relay ASN-GW or directly sent to each other.

Furthermore, all interaction messages between the base station and the Anchor PC are sent through the Relay PC or directly sent to each other.

Furthermore, the mobile station information includes: the traffic stream identifier, the traffic connection identifier, and the information of quality of service.

The present invention also offers a system for accelerating the paging access of the mobile station in broadband wireless system, which includes one or more base stations, a mobile station, an anchor access network gateway, an authenticator and a paging controller, and is characterized in that:

After the Anchor ASN-GW receives the downlink data which is addresses to the mobile station, it sends the MS Info Request message to the paging controller which the mobile station belongs to and receives the MS Info Response message sent back from the paging controller; after the Anchor ASN-GW receives the Data Channel Establishment Request message sent by the base station, it sends the Data Channel Establishment Response message to the base station; after the Data Channel Establishment Acknowledgement message sent by the base station is received, a MS Info Release Announce message is sent to the paging controller;

Said paging controller is used to send Paging Announce message including at least the MSID and the authenticator identifier of the mobile station to the base station; after the MS Info Release Announce message sent by the Anchor ANW-GW is received, it deletes the information saved thereon by the mobile station;

After the base station receives the Paging Announce message sent by the paging controller, it keeps the corresponding relationship of the authentication identifier of the mobile station and its mobile station, and sends MOB-PAG-ADV message to the mobile station; after the RNG-REQ message returned by the mobile station is received, it interacts with the authenticator through the mobile station identifier corresponding to the mobile station to obtain the authentication key and authenticate the RNG-REQ message; while it interacts with the authenticator, said base station sends the MS Info Request message to the paging controller and receives the MS Info Response message sent by the paging controller; said base station sends the Data Channel Establishment Request message to the Anchor ANW-GW, and before or after the Data Channel Establishment Response message sent by the Anchor ANW-GW is received, the RNG-RES message is sent to the mobile station;

After said mobile station receives the MOB-PAG-ADV message sent by the base station for addressing itself, it sends a RNG-REQ message to all base station and receives the RNG-RES message from all base stations;

The authenticator interacts with the parameters of the authenticator identifier corresponding to the mobile station to obtain the authentication key and sends the key to the base station.

Furthermore, the system also includes a relay access network gateway, through which the base station exchanges the information with the Anchor ASN-GW.

Furthermore, the authenticator is an authentication logic module in EAP protocol.

Furthermore, the system also includes a relay paging controller which is charge for the forwarding of the Paging Announce message between the paging controller and the base station.

Furthermore, the MS Info Request message sent by the Anchor ASN-GW to the paging controller the mobile station belongs to includes: the MSID and the parameters of paging indication.

Furthermore, the MS Info Response message sent by the paging controller to the Anchor ASN-GW includes: the MSID and the parameters of traffic authentication indication.

Furthermore, the MS Info Response message obtained from the paging controller by the base station includes: the MSID, the Anchor ASN-GW identifier, the preservation information of the mobile station in Idle mode, and the mobile station information.

Furthermore, the Data Channel Establishment Response message includes: the mobile station information, the carrying tunnel parameters, the traffic stream identifier, and the information of quality of service.

Compared with the prior art, the process of message authentication is largely put ahead, and the process of HMAC/CMAC authentication of the message can be performed while the mobile station information interaction between the base station ands with the Anchor PC is performed, therefore the time for the whole paging access is shortened. Moreover, this method for accelerating the paging access only adds the parameter of Authenticator ID in the Paging Announce message from the PC to the base station, which will not largely increase the process overhead and the storage overhead of the base station, and the base station can directly feed the RNG-RES message of the air interface back to the mobile station when the HMAC/CMAC authentication is not passed, and terminate the remaining procedure, thus avoiding the pointless message overhead.

PREFERRED EMBODIMENT OF THE PRESENT INVENTION

Figure 1:
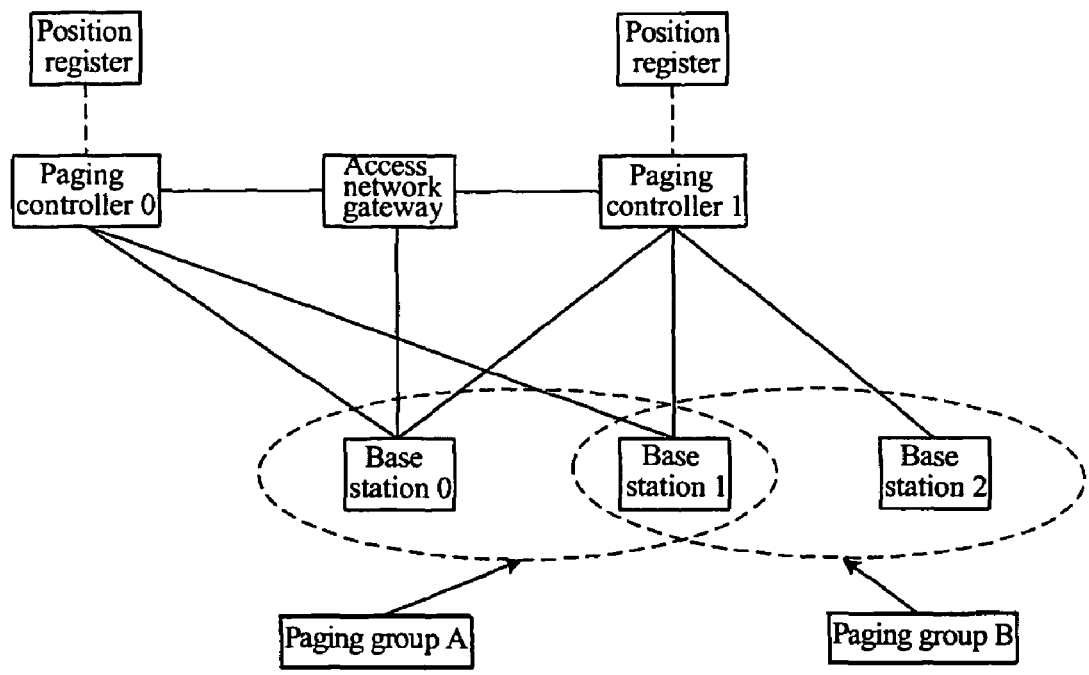
FIG. 1 is an illustration of the logic entity structure of the paging function of 802.16e system.
Figure 2:
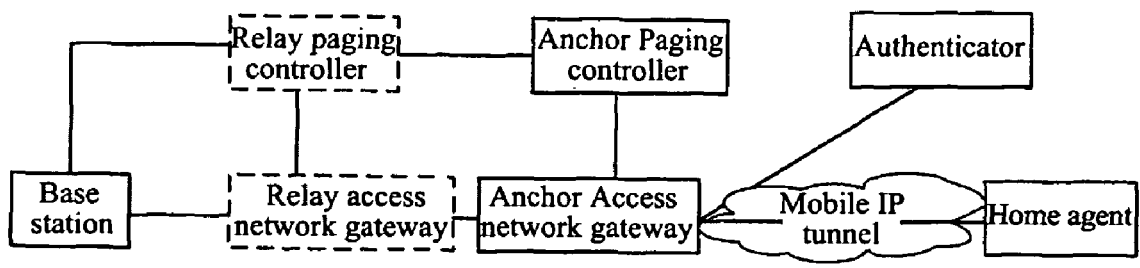
FIG. 2 is an illustration of the networking architecture of 802.16e system.
Figure 3:
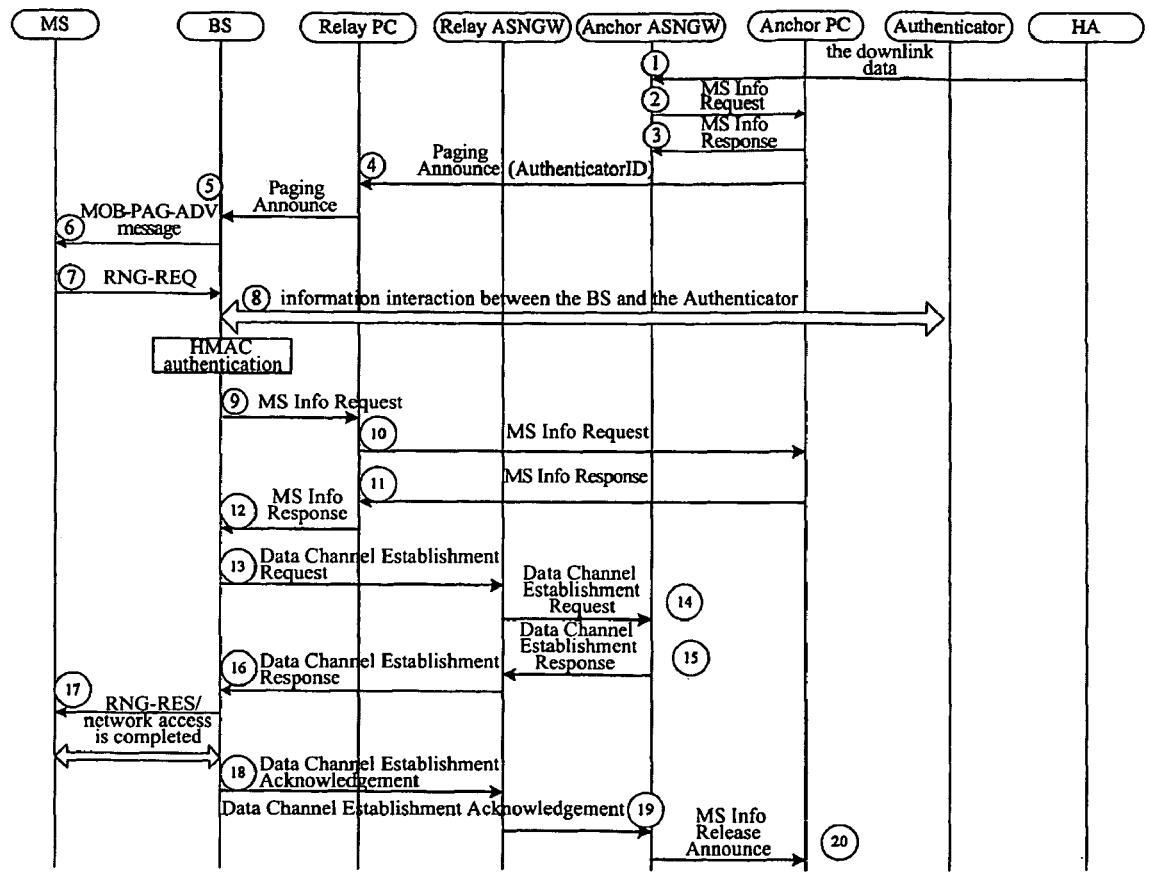
FIG. 3 is an illustration of the process of the implementation for accelerating the paging access of the mobile station in accordance with an embodiment of the present invention.

The process of paging access of the MS in Idle mode of the present invention is shown as FIG. 3, which includes the following steps:

Step 1: the HA sends the downlink data addressed to the mobile station to the Anchor ASN-GW used as the FA through the mobile IP tunnel after it intercepts the data sent to the mobile station;

Step 2: After it determines that the MS is in Idle mode according to the mobile station identifier, the Anchor ASN-GW sends MS Info Request message to the Anchor PC to which the mobile station belongs to obtain the associated information of the mobile station. The MS Info Request message includes at least the mobile station identifier (MSID) and the parameter of paging indication;

Step 3: the Anchor PC sends MS Info Response message to the Anchor ASN-GW, and the message indicates whether the paging operation is authenticated or not and includes at lease the following parameters: MSID and the parameter of the traffic authentication indication;

Step 4 and step 5: when the Anchor PC finds out that the mobile station is authenticated with the paging operation, it sends Paging Announce message to all base stations in the paging group through the Relay PC, and the message includes MSID, the paging group identifier and the Authenticator ID of the MS, and since the Anchor PC can find out the Authenticator ID corresponding to the MS based on the associated information of the MS, the Anchor PC can include this parameter in the message;

Step 6: After the base station receives the message, it keeps the corresponding relationship between the Authenticator ID and MS, and sends MOB-PAG-ADV message to the mobile station;

Step 7: with the indication in the MOB-PAG-ADV message, the mobile station knows that there is data paged to it and the paging re-access needs to be performed, and it sends RNG-REQ message to the base station;

Step 8: while the base station receives the RNG-REQ message, it uses the Authenticator ID parameter corresponding to the MS in the previous Paging Announce message to interact with the authenticator to obtain the authentication key (AK) and the associated context and authenticate the HMAC/CMAC in the RNG-REQ message; If the message authentication fails, the base station directly sends a RNG-RES message with "failure" indication to the MS, and the MS re-performs the whole initial access, that is, re-sends the RNG-REQ message to the base station;

Step 9 and step 10: while the base station interacts with the Authenticator, it sends the MS Info Request message to the Anchor PC through the Relay PC to obtain the associated information of the MS;

Step 11 and step 12: firstly Anchor PC checks the MSID in the MS Info Request message and feeds the MS Info Response message back to the base station through the Relay PC, and the message includes the following parameters: MSID, Anchor ASN-GW identifier, the preservation message of the mobile station in Idle mode, the mobile station message (including the traffic stream identifier, the traffic connection identifier and the information of quality of service (Qos));

Step 13 and step 14: the BS sends the Data Channel Establishment Request message (also can be called as the Data Channel Registration Request message) to the Anchor ASN-GW through the Relay ASN-GW to ask it to establish R4/R6 carrying tunnel;

Step 15 and step 16: the Anchor ASN-GW feeds the Data Channel Establishment Response message back to the base station through the Relay ASN-GW, and the message includes at least: MSID, the context information of the traffic stream (including the carrying tunnel parameters, the traffic stream identifier, and the information of quality of service, etc.).

Step 17: After the base station determines that the carrying tunnel is successfully established, it sends a RNG-RES message with "success" indication to the mobile station;

This step can also be performed before step 13, that is, the base station sends a RNG-RES message with "success" indication to the mobile station after the message is authenticated, and then requests the Anchor ASN-GW to establish (register) a data channel.

Step 18 and step 19: after the mobile station performs the paging re-access to the network, the base station sends the Data Channel Establishment Acknowledgement message to the Anchor ASN-GW (also can be called as the Data Channel Registration Acknowledgement message) through the Relay ASN-GW, and the message includes parameters such as MSID;

Step 20: the Anchor ASN-GW sends the MS Info Release Announce message to the Anchor PC to notify it to delete the information saved thereon by the MS.

Through the above paging process, the MS can successfully exit in Idle mode.

In this method, Relay ASN-GW implements the relay function between the base station and the Anchor ASN-GW, and if there is a direct interface between the base station and the Anchor ASN-GW, all interaction information between the BS and the Anchor ASN-GW can be directly sent to each other without using the Relay ASN-GW. The Relay PC implements the relay function between the base station and the Anchor PC, if there is a direct interface between the BS and the Anchor PC, all interaction information between the BS and the Anchor PC can be directly sent to each other without the Relay PC.

The present invention also offers a system for accelerating the paging access of the mobile station in broadband wireless system, which includes one or more base stations, a mobile station, an anchor access network gateway, an authenticator and a paging controller, and is characterized in that:

After the Anchor ASN-GW receives the downlink data which is addresses to the mobile station, it sends the MS Info Request message to the paging controller which the mobile station belongs to and receives the MS Info Response message sent back from the paging controller; after the Anchor ASN-GW receives the Data Channel Establishment Request message sent by the base station, it sends the Data Channel Establishment Response message to the base station; after the Data Channel Establishment Acknowledgement message sent by the base station is received, a MS Info Release Announce message is sent to the paging controller;

Said paging controller is used to send Paging Announce message including at least the MSID and the authenticator identifier of the mobile station to the base station; after the MS Info Release Announce message sent by the Anchor ANW-GW is received, it deletes the information saved thereon by the mobile station;

After the base station receives the Paging Announce message sent by the paging controller, it keeps the corresponding relationship of the authentication identifier of the mobile station and its mobile station, and sends MOB-PAG-ADV message to the mobile station; after the RNG-REQ message from the mobile station is received, it interacts with the authenticator through the mobile station identifier corresponding to the mobile station to obtain the authentication key and authenticate the RNG-REQ message; while it interacts with the authenticator, said base station sends the MS Info Request message to the paging controller and receives the MS Info Response message sent by the paging controller; said base station sends the Data Channel Establishment Request message to the Anchor ANW-GW, and before or after the Data Channel Establishment Response message sent by the Anchor ANW-GW is received, the RNG-RES message is sent to the mobile station;

After said mobile station receives the MOB-PAG-ADV message sent by the base station for addressing itself, it sends a RNG-REQ message to all base station and receives the RNG-RES message from all base stations;

The authenticator interacts with the parameters of the authenticator identifier corresponding to the mobile station to obtain the authentication key and sends the key to the base station.

If there is no direct interface between the base station and the Anchor ASN-GW, the system also includes a relay access network gateway through which the base station exchanges information with the Anchor ASN-GW. If there is no direct interface between the base station and the Anchor PC, the system also includes a relay PC which is responsible for forwarding the Paging Announce message between the base station and the Anchor PC.

The authenticator is an authentication logic module in EAP protocol.

The MS Info Request message sent by the Anchor ASN-GW to the paging controller the mobile station belongs to includes: the MSID and the parameters of paging indication.

The MS Info Response message sent by the paging controller to the Anchor ASN-GW includes: the MSID and the parameters of traffic authentication indication.

The MS Info Response message obtained from the paging controller by the base station includes: the MSID, the Anchor ASN-GW identifier, the preservation information of the mobile station in Idle mode, and the mobile station information.

The Data Channel Establishment Response message includes: the mobile station information, the carrying tunnel parameters, the traffic stream identifier, and the information of quality of service.

INDUSTRIAL APPLICABILITY

With the implementation method and system offered by the present invention for accelerating the paging access process, the process overhead and storage overhead of the base station will not evidently increase since only the parameter of Authenticator ID is added in the Paging Announce message from the PC to the base station. In the method of the present invention, the process of message authentication is largely put ahead, and the process of HMAC/CMAC authentication of the message can be performed while the mobile station information interaction between the base station ands with the Anchor PC is performed, therefore the time for the whole paging access is shorten, and when the HMAC/CMAC authentication is not passed, the base station can directly feeds the RNG-RES message back to the mobile station and terminates the remaining process, thus avoiding the pointless message overhead.

What we claim is:

1. An implementation method for accelerating paging access of a mobile station in broadband wireless system, comprising the following steps:
 (a) when an Anchor access service network gateway (ASN-GW) finds out that a mobile station(MS) is in an Idle mode when the Anchor access service network gateway receives downlink data addressed to the mobile station, the Anchor access service network gateway notifying an Anchor paging controller to which the mobile station belongs to page the mobile station, and when the Anchor paging controller finds out that the mobile station is authenticated with paging operation, the Anchor paging controller sending a Paging Announce message including at least mobile station identifier (MSID) and Authenticator identifier of the mobile station, to part of or all base stations in a paging group via other Relay paging controller or directly;
 (b) said base stations keeping corresponding relationship between the Authenticator identifier and the mobile station after the base stations receives the message, and sending a MOB-PAG-ADV message of an air interface to the mobile station;
 (c) after the mobile station receives the MOB-PAG-ADV message addressed to the mobile station itself, the mobile station starting a process of paging access, the mobile station sending a RNG-REQ message to the base station after the mobile station completes uplink synchronization, and then after the base station receives the RNG-REQ message returned by the mobile station, the base station interacting with an authenticator with an Authenticator identifier parameter corresponding to the mobile station to obtain an authentication key (AK) and authenticating the RNG-REQ message; and the base station obtaining associated information of said mobile station from the Anchor paging controller while the base station interacts with the authenticator;
 (d) said base station requesting the Anchor access service network gateway to establish a data channel, and before or after the data channel is established, the base station sending a RNG-RES message to the mobile station; and
 (e) after the mobile station completes network access, the base station sending a Data Channel Establishment Acknowledgement message to the Anchor access service network gateway, and after the Anchor access service network gateway receives the Data Channel Establishment Acknowledgement message sent by the base station, the Anchor access service network gateway sending a MS Info Release Announce message to the Anchor paging controller to notify the Anchor paging controller to delete the information saved thereon by the mobile station.

2. The implementation method of claim 1, wherein, in step (d), after the base station confirms that the data channel is successfully established and the message is authenticated, the base station sends a RNG-RES message with "success" indication to the mobile station.

3. The implementation method of claim 1, wherein, in step (c), when authentication of the process of the RNG-REQ message is not passed, the base station directly feeds a RNG-RES message with "failure" indication back to the mobile station, and subsequent steps are stopped.

4. The implementation method of claim 3, wherein, in step (a), the downlink data addressed to the mobile station and received by the Anchor access service network gateway is forwarded by a home agent through a mobile IP tunnel.

5. The implementation method of claim 3, wherein, step (a) further comprises: (a1) based on a mobile station identifier, when the Anchor access service network gateway identifies that the mobile station is in Idle mode after the Anchor access service network gateway receives the downlink data addressed to the mobile station, the Anchor access service network gateway sending to the Anchor paging controller which the mobile station belongs to a MS Info Request message including mobile station identifier and parameters of paging indication; and (a2) the Anchor paging controller sending to the Anchor access service network gateway a MS Info Response message including the mobile station identifier and parameters of traffic authentication indication which indicates whether paging operation is authenticated or not.

6. The implementation method of claim 3, wherein, in step (c), the MS Info Response message includes the following parameters: mobile station identifier, Anchor access service network gateway identifier, preservation information of the mobile station in Idle mode, and mobile station information.

7. The implementation method of claim 3, wherein, in step (d), the Data Channel Establishment Response message includes: mobile station identifier, carrying tunnel parameter, traffic stream identifier, information of quality of service.

8. The implementation method of claim 3, further comprising: sending all interaction messages between the base stations and the Anchor access service network gateway to each other through a Relay access service network gateway or directly.

9. The implementation method of claim 3, further comprising: sending all interaction messages between the base stations and the Anchor paging controller to each other through the Relay paging controller or directly.

10. The implementation method of claim 6, wherein the mobile station information includes: traffic stream identifier, traffic connection identifier, and information of quality of service.

11. A system for accelerating paging access of a mobile station in broadband wireless system, comprising one or more base stations, a mobile station, an anchor access network gateway, an authenticator, and a paging controller, characterized in that:
said Anchor access service network gateway is configured to: after receiving downlink data addressed to the mobile station, sends a MS Info Request message to the paging controller which the mobile station belongs to and receives the MS Info Response message sent back from the paging controller; after receiving a Data Channel Establishment Request message sent by the base station, sends a Data Channel Establishment Response message to the base station; and after receiving a Data Channel Establishment Acknowledgement message sent by the base station, send a MS Info Release Announce message to the paging controller;
said paging controller is configured to send a Paging Announce message including at least mobile station identifier and authenticator identifier of the mobile station to the base stations; and after receiving the MS Info Release Announce message sent by the Anchor access service network gateway, delete the information saved thereon by the mobile station;
said base station is configured to: after receiving the Paging Announce message sent by the paging controller, keep corresponding relationship of the authenticator identifier of the mobile station and mobile station, and send a MOB-PAG-ADV message to the mobile station; after receiving a RNG-REQ message returned by the mobile station, interact with the authenticator through the mobile station identifier corresponding to the mobile station to obtain an authentication key and authenticate the RNG-REQ message; while interacting with the authenticator, send the MS Info Request message to the paging controller and receive the MS Info Response message sent by the paging controller; and send the Data Channel Establishment Request message to the Anchor access service network gateway, and before or after receiving the Data Channel Establishment Response message sent by the Anchor access service network gateway, send the RNG-RES message to the mobile station;
said mobile station is configured to, after receiving the MOB-PAG-ADV message sent by the base station for addressing the mobile station itself, send the RNG-REQ message to all base stations and receives the RNG-RES message from all base stations;
said authenticator is configured to interact with the authenticator identifier parameters corresponding to the mobile station to obtain the authentication key and send the authentication key to the base station.

12. The system for accelerating paging access of a mobile station in broadband wireless system of claim 11, further comprising a relay access network gateway, configured to exchanges information with the Anchor access service network gateway by the base station through the relay access network gateway.

13. The system for accelerating paging access of a mobile station in broadband wireless system of claim 11, wherein the authenticator is an authentication logic module in EAP protocol.

14. The system for accelerating paging access of a mobile station in broadband wireless system of claim 11, further comprising a relay paging controller, which is in charge of forwarding of the Paging Announce message between the paging controller and the base station.

15. The system for accelerating paging access of a mobile station in broadband wireless system of claim 11, wherein the MS Info Request message sent by the Anchor access service network gateway to the paging controller which the mobile station belongs to includes: mobile station identifier and parameters of paging indication.

16. The system for accelerating paging access of a mobile station in broadband wireless system of claim 11, wherein the MS Info Response message sent by the paging controller to the Anchor access service network gateway includes: mobile station identifier and parameters of traffic authentication indication.

17. The system for accelerating paging access of a mobile station in broadband wireless system of claim 11, wherein the MS Info Response message obtained from the paging controller by the base station includes: mobile station identifier, Anchor access service network gateway identifier, the preservation information of the mobile station in Idle mode, and mobile station information.

18. The system for accelerating paging access of a mobile station in broadband wireless system of claim 11, wherein the Data Channel Establishment Response message includes: mobile station information, carrying tunnel parameters, traffic stream identifier, and information of quality of service.

19. The implementation method of claim 2, wherein, in step (c), when authentication of the process of the RNG-REQ message is not passed, the base station directly feeds a RNG-RES message with "failure" indication back to the mobile station, and subsequent steps are stopped.

* * * * *